(12) United States Patent
Coppelletti

(10) Patent No.: US 10,272,452 B2
(45) Date of Patent: Apr. 30, 2019

(54) MECHANICAL GRAVIMETRIC DISK DISPENSER

(71) Applicant: ARTEC S.P.A., Solignano (PR) (IT)

(72) Inventor: Girolamo Coppelletti, Solignano (IT)

(73) Assignee: ARTEC S.P.A., Solignano (PR) (IT)

( * ) Notice: Subject to any disclaimer, the term of this patent is extended or adjusted under 35 U.S.C. 154(b) by 406 days.

(21) Appl. No.: 15/093,267

(22) Filed: Apr. 7, 2016

(65) Prior Publication Data

US 2016/0296953 A1 Oct. 13, 2016

(30) Foreign Application Priority Data

Apr. 10, 2015 (IT) .............................. PR2015A0022

(51) Int. Cl.
| | |
|---|---|
| *B05B 3/10* | (2006.01) |
| *B05B 7/14* | (2006.01) |
| *B05B 12/00* | (2018.01) |
| *F23D 14/32* | (2006.01) |
| *G01F 11/24* | (2006.01) |
| *G01F 11/46* | (2006.01) |

(52) U.S. Cl.
CPC .......... *B05B 3/1035* (2013.01); *B05B 7/1486* (2013.01); *B05B 12/008* (2013.01); *F23D 14/32* (2013.01); *G01F 11/24* (2013.01); *G01F 11/46* (2013.01)

(58) Field of Classification Search
CPC ... B65G 53/4616; B05B 7/144; B05B 7/1486; G01F 11/24
USPC ......... 406/52, 63, 66, 67, 135; 222/370, 636
See application file for complete search history.

(56) References Cited

U.S. PATENT DOCUMENTS

| | | | | |
|---|---|---|---|---|
| 2,216,921 A | * | 10/1940 | Marvel .................. | B01D 37/02 137/238 |
| 2,262,094 A | * | 11/1941 | Burt .................... | B65G 53/4616 241/60 |
| 2,285,216 A | * | 6/1942 | Lundgren .......... | B65G 53/4616 406/135 |
| 2,322,808 A | * | 6/1943 | Hothersall .............. | F16N 19/00 222/327 |
| 3,201,001 A | | 8/1965 | Roberts et al. | |
| 4,085,871 A | | 4/1978 | Miksitz | |
| 4,227,835 A | * | 10/1980 | Nussbaum .............. | B05B 7/144 222/636 |
| 4,789,569 A | * | 12/1988 | Douche ................. | G01F 13/001 118/308 |
| 5,104,230 A | * | 4/1992 | Douche ................. | G01F 13/001 222/238 |

(Continued)

FOREIGN PATENT DOCUMENTS

| | | |
|---|---|---|
| DE | 195 00 726 A1 | 7/1996 |
| GB | 186 113 | 4/1970 |

OTHER PUBLICATIONS

Italian Search Report dated Dec. 18, 2015, in corresponding Italian priority application.

*Primary Examiner* — William R Harp
(74) *Attorney, Agent, or Firm* — Young & Thompson

(57) ABSTRACT

A mechanical gravimetric disk dispensing apparatus, which in order to prevent compaction of the powder and maintain the flow thereof constant, has a container equipped with an internal mixer that does not require external motorization since it uses that for the rotation of the dosing disk. The mixer is equipped with scrapers to distribute the powder and make it flow on the disk.

10 Claims, 5 Drawing Sheets

(56) References Cited

U.S. PATENT DOCUMENTS

| | | | |
|---|---|---|---|
| 5,573,149 A * | 11/1996 | Saito | B05B 7/144 |
| | | | 222/152 |
| 6,123,486 A | 9/2000 | Wilms et al. | |
| 7,674,076 B2 * | 3/2010 | Van Steenkiste | B65G 53/48 |
| | | | 406/52 |
| 2004/0047695 A1 | 3/2004 | Martin | |
| 2005/0247742 A1 | 11/2005 | Livingston et al. | |
| 2008/0145157 A1 | 6/2008 | Scharger | |

* cited by examiner

MECHANICAL GRAVIMETRIC DISK DISPENSER

FIELD OF THE INVENTION

The present invention relates to the field of powder feeding systems for stand-alone operation or integrated into coating systems of components, in particular for plasma or HVOF applications, or also in vacuum.

PRIOR ART

The most common types of dispensers available on the market are two, "mechanical" and "fluid bed".

The mechanical dispenser consists of a container, a mechanical powder transportation system (disk or screw) and a system for maintaining the powder fluid (mixer). The powder placed inside the container is deposited by gravity on the disk by means of two pads that determine the powder section on the dosing disk (or screw), the speed of the latter then determines the flow rate thereof. The hermetically sealed container is fed with a gas flow which, exiting through the only opening provided, aspirates the powder from the disk through a suitably shaped pad and carries it to the end use. In the case of a screw, this drops the powder into a hopper and gas carries it to its use. In order to prevent the powder from falling onto the disk or screw in a discontinuous manner, a mixer is provided inside the container comprising a whisk which, separately motorized, maintains the powder in motion. The motorization is normally placed on the lid used for filling the container.

The "fluid bed" dispenser also consists of a container, a pneumatic powder transportation system and a pneumatic vibration system for maintaining the powder fluid (fluid bed). The powder placed inside the hermetically sealed container is aspirated by the applied gas flow. A special pneumatic vibration system is applied to the base of the container which maintains the powder in motion, prevents the compaction thereof and keeps the aspirated flow thereof constant. The amount of transported powder therefore depends on the gas flow and on the applied vibrations.

SUMMARY OF THE INVENTION

An object of the present invention is to provide an improved dispensing apparatus, of the mechanical gravimetric disk type, suitable for use with plasma and HVOF torches, and also in vacuum due to the double seals, with a simple, rational and cost-effective solution.

These and other objects are achieved with the features of the invention described in the independent claim. The dependent claims describe preferred and/or particularly advantageous aspects of the invention.

In particular, one embodiment of the present invention provides a dispenser comprising an internal mixer which, unlike those known and used so far, does not need external motorization on the lid but uses the same motorization as that used for the rotation of the dosing disk.

This solution allows preventing the compaction of the powder and the powder flow from the container is kept constant.

Another aspect of the invention is to provide a dispenser with stirrer of umbrella constructive shape.

This solution allows preventing the weight of the powder from affecting the dispensed quantity.

Another aspect of the invention is to provide a dispenser where the mixer is provided with a series of scrapers, appropriately shaped, for distributing the powder and making it flow on a suitable element, known as pad, and which, in contrast to those currently employed, is made in a single piece.

This solution ensures maximum stability and durability of the system; furthermore, it allows recovering the powder not aspirated.

Another aspect of the invention is to provide a dispenser in which the bottom and internal part of the container, at the level of said mixer, has an expanding area.

This solution allows the powder to fall freely without compacting and creating bridges.

Another aspect of the invention is to provide a dispenser with lid lacking motorization and therefore provided with a transparent porthole to aid the inspection inside the container.

In addition, the lid is equipped with a vent hole to prevent explosions; to this end, following a rotation of the lid by ½ turn to open the container, a hole is opened to vent any internal pressure to the bottom, preventing the lid from "exploding", once the thread has been disengaged, thereby causing damage to persons or property.

Moreover, advantageously, the container is equipped with a pressure gauge that indicates the internal pressure and a safety valve also having the option of manually venting the overpressure.

Other advantages are
- The special internal geometry of the container which facilitates a fast cleaning thereof in the powder change.
- The particle size of the powders that can be fed is up to 3 microns.
- The flow rates are divided into two ranges, the first one from 5 to 150 g/min, with accuracy of +/−2 g, the second one from 50 to 500 g/min, with accuracy of +/−9 g.
- Full interchangeability with mechanical couplings currently on the market or at least most used, therefore with power take-off, slot for manual locking and carrier gas coupling on the lower base of the container "plate".
- Setup for quick manual/automatic locking system.
- Small size in relation to the volume contained; consider for example that a 5 liters of known type is more than 1000 mm high, while the present invention reaches 610 mm.
- The 130 mm diameter opening of the container allows smooth and quick filling or emptying.
- The lack of motorization on the lid, such as those currently known, also allows the continuous filling of the dispenser by means of a upper loading hopper and feeding system.

Said objects and advantages are all achieved by the powder dispenser, of the mechanical gravimetric disk type, suitable for use with plasma and HVOF torches and in vacuum, object of the present invention, which is characterized by the appended claims.

BRIEF DESCRIPTION OF THE DRAWINGS

This and other features will be more apparent from the following description of some of the configurations, illustrated purely by way of example in the accompanying drawings.

DETAILED DESCRIPTION OF THE INVENTION

Figure 1:
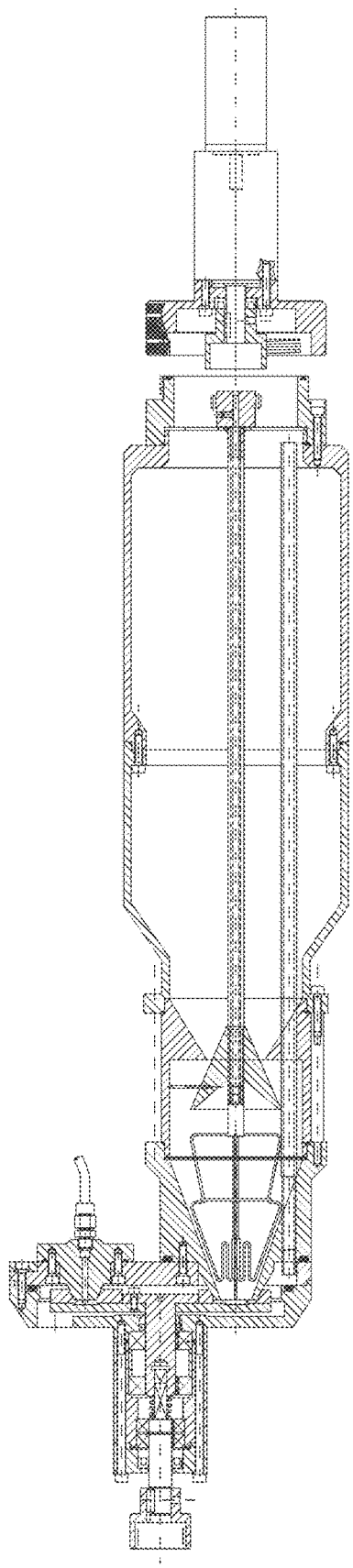
FIG. 1: shows a mechanical gravimetric disk dispenser of known type.

With particular reference to the figures, reference numeral 10 globally indicates a mechanical gravimetric disk dispensing apparatus for dosing powders and suitable for use with HVOF and plasma torches and in vacuum.

It substantially consists of a cylindrical casing, a substantially vertical and hermetically closed container 20.

If AA identifies the axis of the dispenser, it is noted that container 20 consists of two joined parts, a top portion indicated with reference numeral 22 and a bottom one indicated with reference numeral 24.

The portion indicated with reference numeral 22 has a converging pattern from about half the height downwards, i.e. with walls 21 narrowing towards axis AA.

At the top, portion 22 can be closed by a lid 30, a lid which is adapted to hermetically seal the top powder inlet mouth 23; as is seen, in the invention claimed herein, the lid lacks motorization.

For this reason, lid 30 may also be provided with a transparent porthole 35 to aid the inspection inside container 20.

In addition, with reference again to lid 30, this is provided with at least one vent hole
  160 to prevent explosions, where following an opening rotation of ½ turn, a hole is opened to vent any internal pressure.
  At least one pressure gauge 170 that indicates the internal pressure and a safety valve also having the option of manually venting the overpressure.

With reference again to container 20, it is noted that it contains:
  a. at least one system 40 for maintaining the powder therein fluid, i.e. a mixing device,
  b. at least one mechanical transportation system 50 for the deposited powder, such as a motorized rotating disk 60, upon which the powder inside the container deposits by gravity, by means of a first calibration matching part 70 which determines the powder section on the rotating disk 60;
  c. at least one gas flow feeding system 80 which, once introduced into container 20, exits through a single opening 85 found in the container, aspirating the powder from the rotating disk 60 by means of a second calibration matching part 90.

It is noted immediately that in the present invention, said first 70 and second 90 calibration matching parts are a single element 100 of annular disk shape, a pad with an internal hollow portion facing the rotating disk 60. Said single element 100 bears two holes 105, 106, one for entrance and the other for the exit of the powder; said holes at a corresponding continuous annular track 110 of the disk element 60 wherein the powder is directed.

Figure 2:
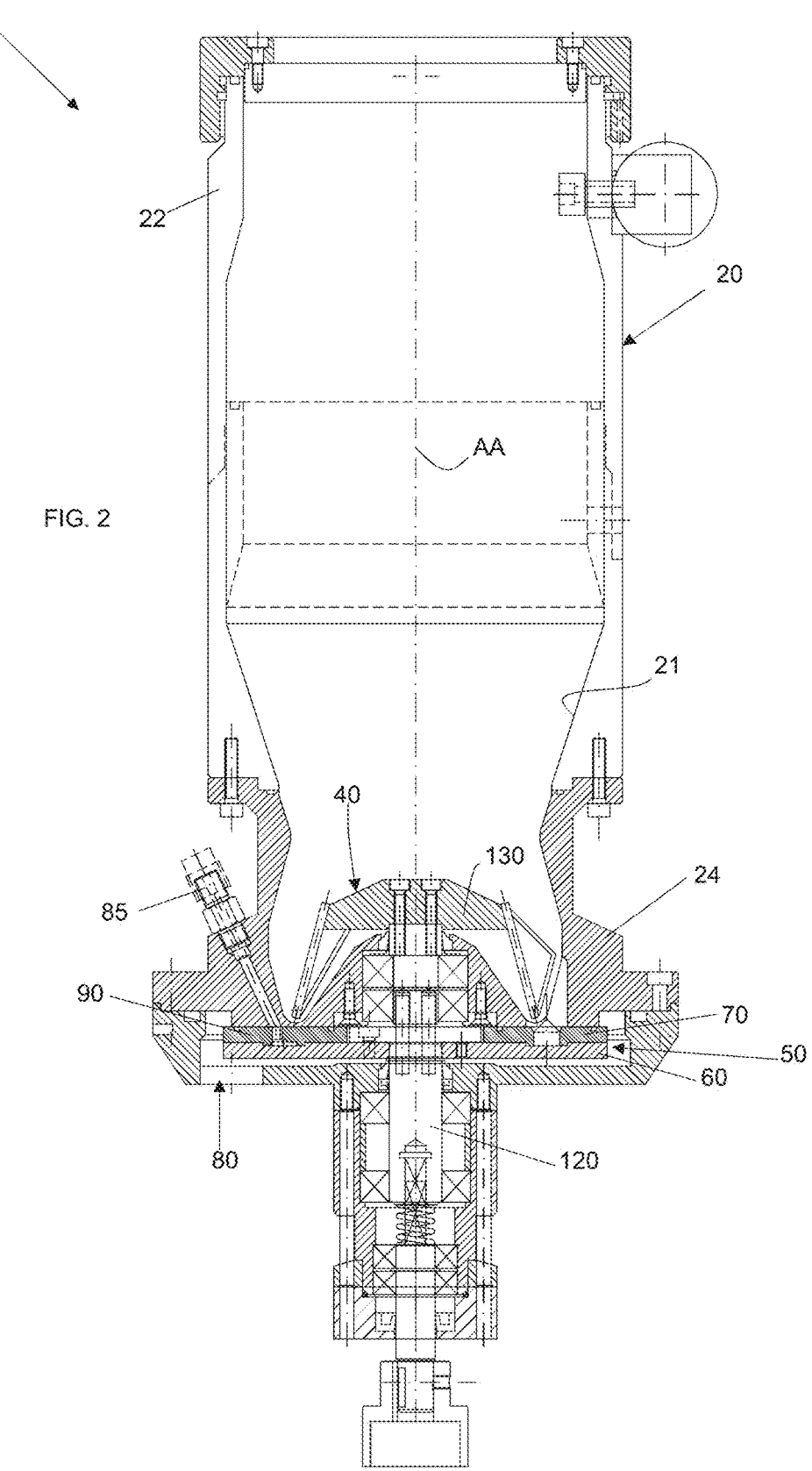
FIG. 2: shows the mechanical gravimetric disk dispenser of the present invention.
Figure 3:
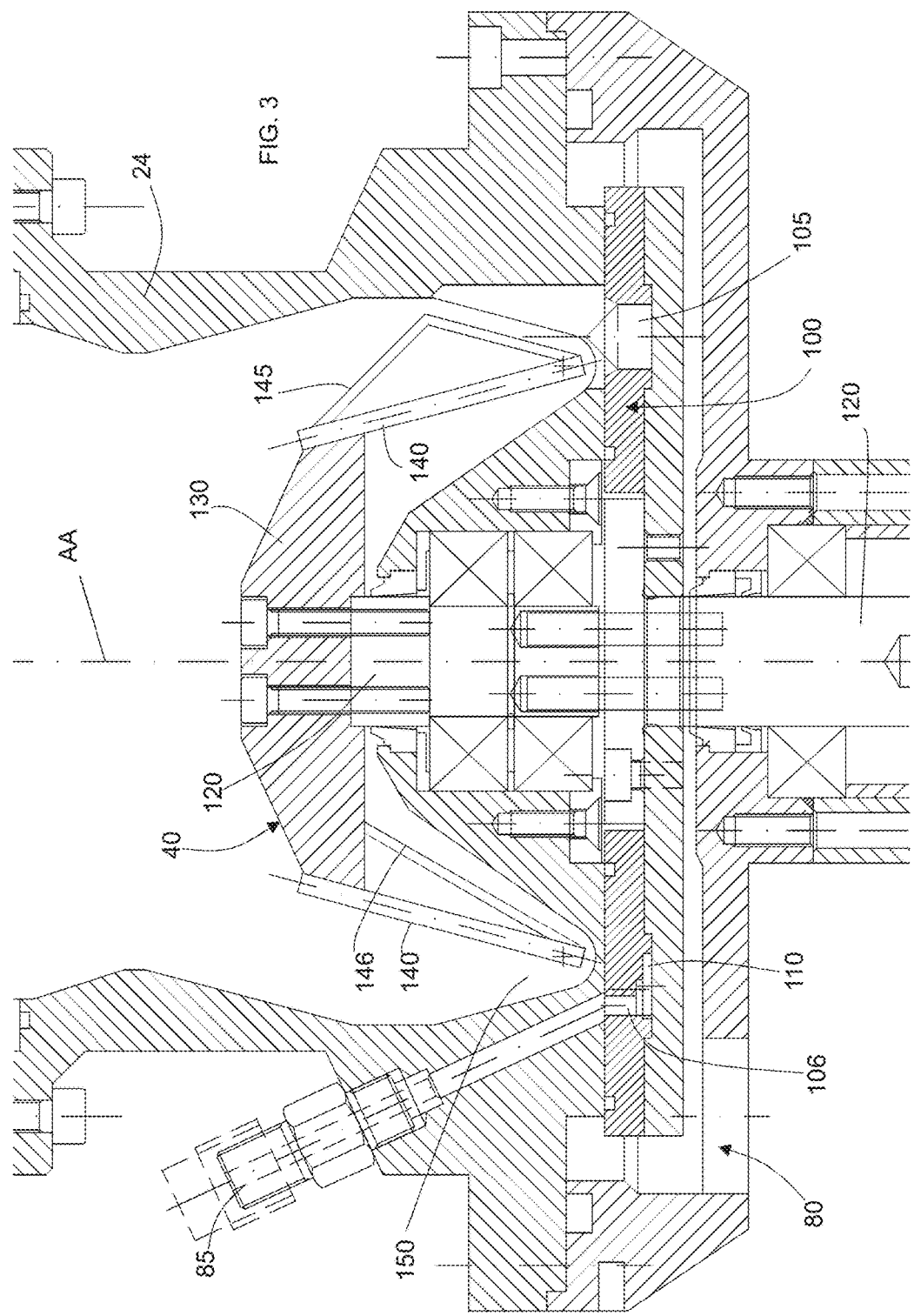
FIG. 3: shows the detail of the powder mixing and distribution zone on the disk.
Figure 4:
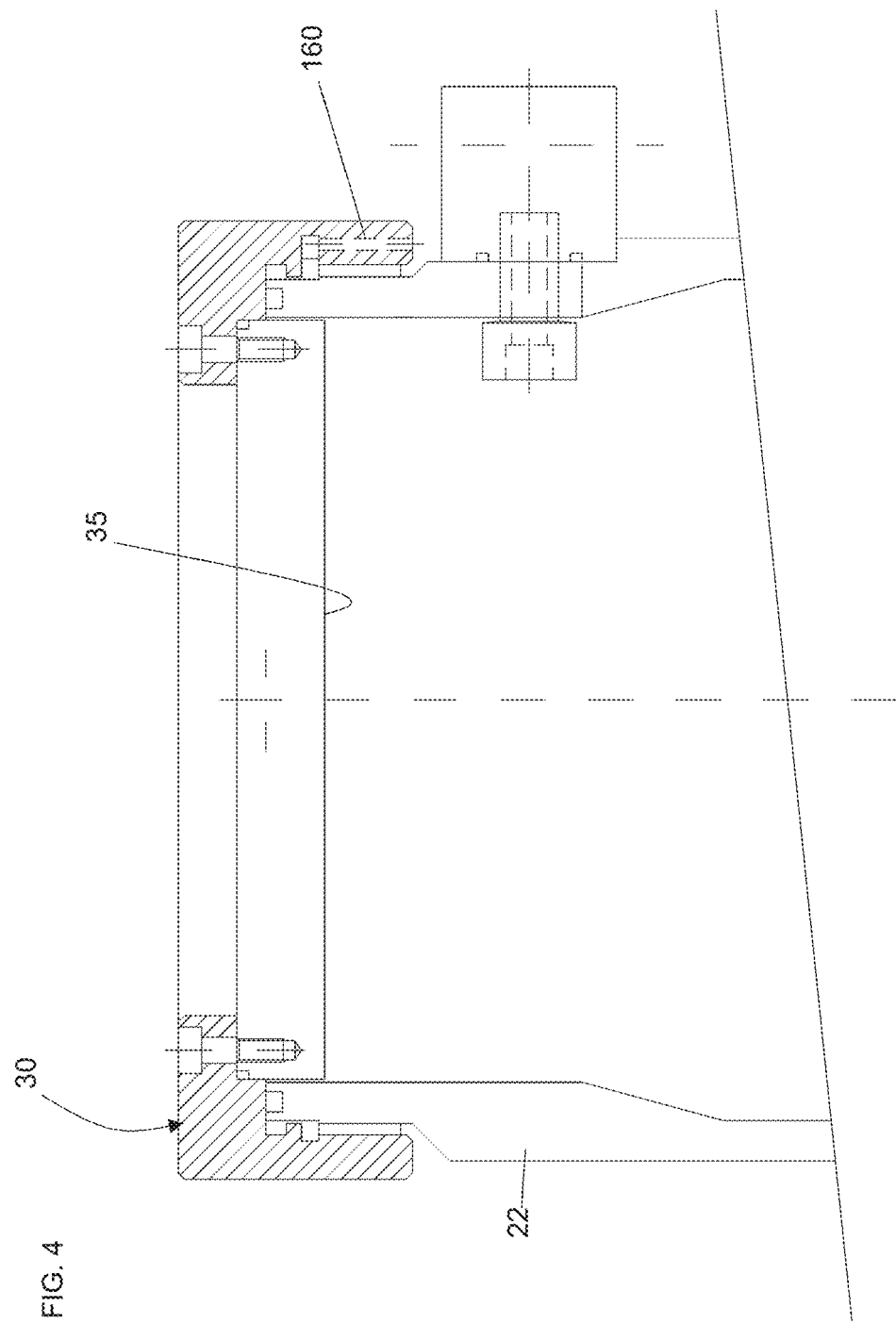
FIG. 4: shows the top portion with lid lacking a motorization system of the mixer.
Figure 5:
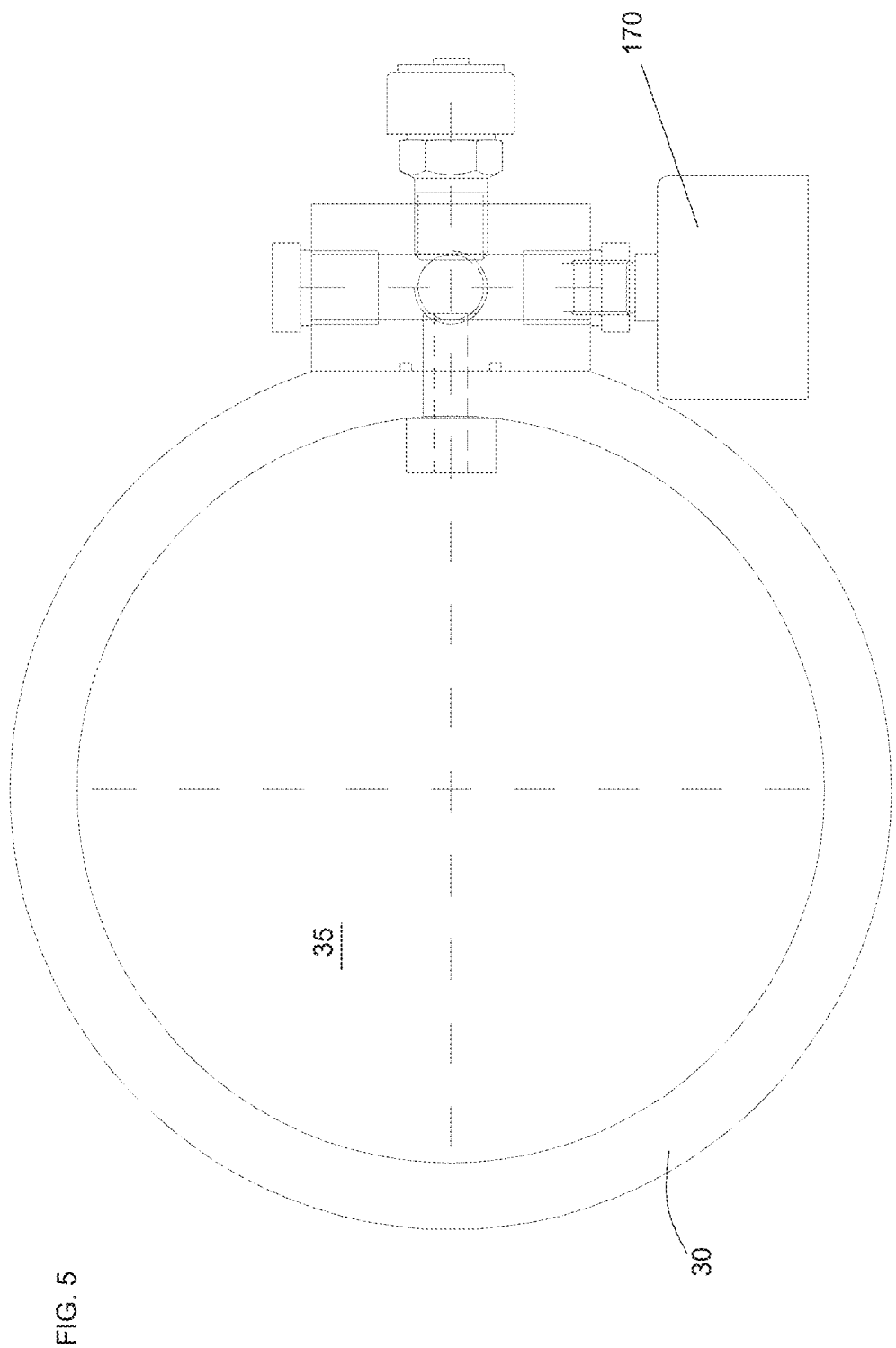
FIG. 5: shows the dispenser from the top, with a transparent porthole for visual inspection on the powder inlet mouth side.

As shown in particular in FIGS. 2 and 3, unlike the prior art used so far and shown in FIG. 1, system 40 suitable for maintaining the powder in container 20 fluid is co-axial with the rotation of the rotating disk, so the same axis AA, and uses the same motorization as that used for the rotation of said rotating disk 60 for the dosage of a powder; said motorization is positioned at the bottom and external to the container, and transmits the motion through at least one pivot 120 which is inserted from the bottom, integrally rotates the disk, continues upwards and exits into the container where it is made integral with the head of the system for maintaining the powder fluid.

In other words, the same pivot 120, co-axial with axis AA, moves disk 60 and a central element 130, part of system 40, in rotation; said central element 130 substantially is a hat shaped element, a preferably a disk shaped or polygonal element, which is joined at the head of said pivot 120; a series of elements 140 or cylindrical rods are integral therewith at the periphery of said element and extend towards bottom 150 of the container and are adapted to distribute the powder and direct it towards the rotating disk 60.

In particular, said cylindrical rods 140 are tilted with incident inclination converging towards the common rotation axis AA at a higher point of the container such that they open towards the bottom.

In addition, said cylindrical rods 140 bear a series of further rods 145, 146 or scrapers of which:
  a first series of scrapers 145 operates externally to the rotating portion of said system for maintaining the powder fluid and comprises a knee 147 with a bending angle pointed towards the container,
  a second series of scrapers 146 operates internally to the rotating portion of said system for maintaining the powder fluid.

In other words, system 40 for maintaining the powder fluid is of umbrella constructive shape which prevents the weight of the powder from affecting the dispensed quantity.

Precisely, container 20, that is the lower portion 24 at level with said system for maintaining the powder fluid, is shaped such that the internal walls 26 diverge from each other displaying an expanding area, and converge again 27 towards axis AA after the central element.

In summary, the dispenser of the invention is of the mechanical gravimetric disk type which, according to what described in the preceding pages, allows:
  the full interchangeability with known couplings and carrier gas coupling on the lower base of the container.
  setup for quick manual/automatic locking system.
  small size in relation to the volume contained.
  large opening of the container which allows smooth and quick filling or emptying.
  lid provided with a transparent porthole to aid the inspection inside the container. In addition, the lid is equipped with a vent hole to prevent explosions and with a pressure gauge that indicates the internal pressure and a safety valve also having the option of manually venting the overpressure.
  To prevent compaction of the powder and maintain the flow thereof constant, the container is equipped with an internal mixer that does not require external motorization from the top since it uses that for the rotation of the dosing disk.
  The umbrella constructive shape allows preventing the weight of the powder from affecting the dispensed quantity.
  The mixer is equipped with scrapers to distribute the powder and make it flow on the rotating disk pad.
  Pad made as a single piece to ensure maximum stability and durability of the system; furthermore, it allows recovering the powder not aspirated.

The bottom of the container, at the level of the mixer, has an expanding area allowing the powder to fall freely without compacting and creating bridges.

The invention claimed is:

1. A mechanical gravimetric disk dispenser, for the dosage of powders suitable for use with plasma and HVOF torches and in vacuum, comprising:
  a substantially vertical, hermetically sealable container, containing therein:
    a mixer that maintains a powder in a container fluid,
    a mechanical transportation system that transports the deposited powder, comprised of a motorized rotating disk, and upon which the powder inside the container is deposited by gravity by means of a first calibration matching part that determines a powder section on the rotating disk, and
    a gas flow feeding conduit, which exits through a single opening and in the container, and that aspirates the powder from the rotating disk by means of a second calibration matching part,
  wherein the mixer is co-axial with a rotation axis of the rotating disk and uses a same drive assembly as that used for rotation of said rotating disk for the dosage of a powder,
  wherein said drive assembly is positioned at a bottom of the container and external to the container, and transmits motion through a pivot that is inserted from a bottom portion of the container, said drive assembly rotates the disk and continues upwards and exits into the container where said drive assembly is made integral with a head of the mixer,
  wherein a central element is joined to said pivot, and a series of rods are positioned at a periphery of said central element and extend towards the bottom of the container, the series of rods adapted to distribute the powder and direct the powder towards the rotating disk, and
  wherein said rods are tilted with incident inclination converging towards the rotation axis of the rotating disk and opening towards the bottom of the container.

2. The dispenser according to claim 1, wherein said rods bear a series of scrapers of which:
  a first series of scrapers extending externally with respect to the rods and each comprise a knee with a bending angle pointed towards the container, and
  a second series of scrapers extending internally with respect to the rods.

3. The dispenser according to claim 1, wherein said first and second calibration matching parts are a single element of annular disk shape, the single element having an internal hollow portion, facing the rotating disk,
  said single element bearing two calibrated holes, one for the entrance of the powder and the other for the exit of the powder, and
  said calibrated holes being located at a corresponding continuous annular track of the rotating disk where the powder is directed.

4. The dispenser according to claim 1, further comprising:
  a lid for hermetically closing the container,
  the lid lacking motorization and bearing a transparent porthole that provides for inspection of an interior of the container.

5. The dispenser according to claim 4, wherein the lid is equipped with a vent hole to prevent explosions.

6. The dispenser according to claim 1, wherein the container includes a pressure gauge that indicates an internal pressure, and a safety valve configured for venting an overpressure.

7. The dispenser according to claim 1, wherein the mixer is of umbrella constructive shape which prevents the weight of the powder from affecting the dispensed quantity.

8. The dispenser according to claim 1, wherein the container, at a lower portion of the container at level with said mixer, is shaped such that internal walls of the container diverge from each other displaying an expanding area, and converge again towards the axis above the central element.

9. A mechanical gravimetric disk dispenser, for the dosage of powders suitable for use with plasma and HVOF torches and in vacuum, comprising:
  a substantially vertical, hermetically sealable container, containing therein:
    a mixer that maintains a powder in a container fluid,
    a mechanical transportation system that transports the deposited powder, comprised of a motorized rotating disk, and upon which the powder inside the container is deposited by gravity by means of a first calibration matching part that determines a powder section on the rotating disk, and
    a gas flow feeding conduit, which exits through a single opening in the container, and that aspirates the powder from the rotating disk by means of a second calibration matching part,
  wherein the mixer is co-axial with a rotation axis of the rotating disk and uses a same drive assembly as that used for rotation of said rotating disk for the dosage of a powder, and
  wherein the container, at a lower portion of the container at level with said mixer, is shaped such that internal walls of the container diverge from each other displaying an expanding area, and converge again towards the axis above the central element.

10. A mechanical gravimetric disk dispenser, for the dosage of powders suitable for use with plasma and HVOF torches and in vacuum, comprising:
  a substantially vertical, hermetically sealable container, containing therein:
    a mixer that maintains a powder in a container fluid,
    a mechanical transportation system that transports the deposited powder, comprised of a motorized rotating disk, and upon which the powder inside the container is deposited by gravity by means of a first calibration matching part that determines a powder section on the rotating disk, and
    a gas flow feeding conduit, which exits through a single opening in the container, and that aspirates the powder from the rotating disk by means of a second calibration matching part,
  wherein the mixer is co-axial with a rotation axis of the rotating disk and uses a same drive assembly as that used for rotation of said rotating disk for the dosage of a powder,
  wherein said drive assembly is positioned at a bottom of the container and external to the container, and transmits motion through a pivot that is inserted from a bottom portion of the container, said drive assembly rotates the disk and continues upwards and exits into the container where said drive assembly is made integral with a head of the mixer,
  wherein a central element is joined to said pivot, and a series of rods are positioned at a periphery of said central element and extend towards the bottom of the container, the series of rods adapted to distribute the powder and direct the powder towards the rotating disk, and wherein the container, at a lower portion of the container at level with said mixer, is shaped such that internal walls of the container diverge from each other displaying an expanding area, and converge again towards the axis above the central element.

* * * * *